United States Patent Office 3,239,317
Patented Mar. 8, 1966

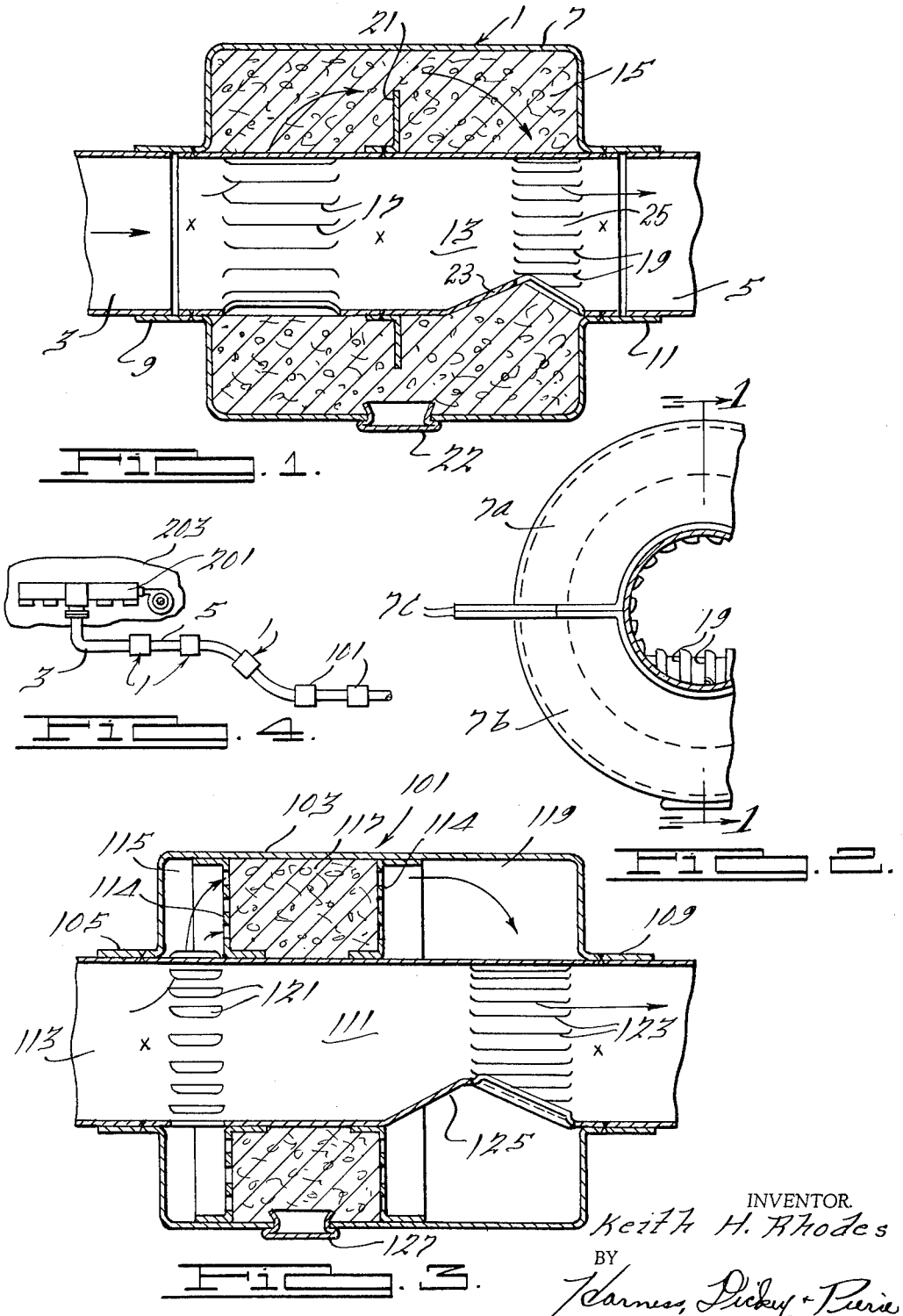

3,239,317
MUFFLER
Keith H. Rhodes, Racine, Wis., assignor to Walker Manufacturing Company, a corporation of Delaware
Filed June 25, 1963, Ser. No. 290,510
6 Claims. (Cl. 23—288)

My invention relates to exhaust systems for internal combustion engines and, in particular, concerns a catalytic converter for unburned, smog producing constitutents in the exhaust gases.

It is the purpose of my invention to provide a simple but effective catalytic converter for use in automotive exhaust systems. The design is capable of relatively inexpensive mass production and by using a multiplicity of them in an exhasut system the amount of unburned constituents can be brought down from relatively high levels to the neighborhod of 2% CO and 300 p.p.m. (parts per million) hydrocarbons, if not actually low enough to meet California State requirements (1½% CO and 275 p.p.m. hydrocarbons).

In a catalytic converter according to the invention, part of the gas flows through a catalyst bed and the remainder does not. An embodiment of the invention has a straight through flow center tube surrounded by a chamber containing a catalyst bed. Upstream and downstream banks of louvers are formed in the center tube so that in addition to flowing straight through the center tube the gas can flow longitudinally through the catalyst bed where some conversion of unburned constituents will occur. However, the amount of conversion is insufficient to release enough heat to raise the temperature of the converter to a dangerous degree so the unit is self-temperature controlled. A venturi is formed in the center tube at the downstream bank of louvers so that the reduction of pressure and velocity increase in the venturi and the gas frictional loss of the venturi will help induce the gas to flow through the catalyst bed.

The invention is illustrated in the accompanying drawings in which:

FIG. 1 is a longitudinal section through a presently preferred form of catalytic converter embodying the invention as taken on line 1—1 of FIG. 2;

FIG. 2 is an end elevation taken from the right of FIG. 1 with a section of pipe omitted;

FIG. 3 is a longitudinal section of another embodiment of the invention; and

FIG. 4 is a schematic catalytic converter exhaust system composed of converters of this invention.

The catalytic converter 1 of this invention is shown between two conduits 3 and 5 of an automotive exhaust gas system. It is contemplated that several converters 1 will be used in a system and they will serve to silence the exhaust gases as well as remove large amounts of unburned constitutents.

The converter 1 comprises an outer shell 7 which may be of one piece, swaged down construction or which may be formed from two pancake halves 7a and 7b jointed together in mating flanges 7c as seeen in FIG. 2. Either type shell is already in mass production by the assignee of this application for use as silencing (spit) chambers in automotive mufflers. The shell 7 has an inlet bushing 9 and an outlet bushing 11 which receive and are clamped or spotwelded to pipe sections 3 and 5.

Inside of shell 7 is a center tube 13 which is spotwelded at "x" to the bushings 9 and 11. The space between the shell 7 and tube 13 comprises a chamber 15 that is filled with catalyst. An upstream bank of louvers 17 and a downstream bank of louvers 19 are formed around the circumference of the tube 13 adjacent the ends of the shell 7 so that gas can leave the center tube 13 through louvers 17 and flow longitudinally through the catalyst filled chamber 15 and back into the tube through the louvers 19. A baffle ring or partition 21 may be mounted on the tube 13 in chamber 15 to prevent short circuiting of the gas flow between the two louver banks. A removable plug 22 will permit refilling of chamber 15 with fresh catalyst.

In order to induce flow through chamber 15, a wedge shaped dent 23 is formed in the side of the tube 13 to provide a venturi throat 25, the louvers 19 being on the downstream side of the dent 23. The increased gas velocity and reduced pressure at the dent venturi 25 induces gas to flow through the catalyst bed 15. Turbulence at the venturi outlet bank 19 will cause mixing of the gas that has gone straight through the piple 13 with the converted gas coming from chamber 15 before passage to the next stage in the exhaust system which may be another converter 1.

FIG. 3 shows a modified converter 101 with an outer shell 103 having inlet and outlet bushings 105 and 109. To illustrate an alternative arrangement that could also be used with converter 1, the center tube 111 is shown as a part of a longer pipe 113 that extends upstream and downstream of the converter 101 and which may have other converters mounted thereon at other suitable locations in the exhaust system.

Two perforated transverse partitions 114 divide the space between the shell 103 and tube 111 into an inlet chamber 115, a catalyst bed or chamber 117 that is filled with catalyst, and an outlet chamber 119. The tube 111 has an upstream bank of louvers 121 to permit flow into inlet chamber 115 and a downstream bank of louvers 123 to permit flow out of outlet chamber 119. A dent venturi 125, corresponding to the one described above, is formed in pipe 111 so that the louvers 123 are on the downstream side. The removable plug 127 permits filling of chamber 117 with fresh catalyst.

It is understood, of course, that the louvers 17 and 19 in converter 1 and the perforations in the partitions 114 are sized to prevent escape of catalyst pellets. The distribution of perforations in partitions 114 can be selected to cause relatively uniform flow through the bed 117.

It will be noted that the heat released during gas flow through the catalyst bed in either converter will be drained into the outer shell and center tube. It can radiate out from the outer shell and the gas flow through the center tube will carry the heat away. Thus, the converter is self-cooling and self-temperature limiting.

It will be seen that by using a series of converters 1 or 101 (such as illustrated in FIG. 4 as connected to the exhaust manifold 201 of engine 203), large amounts of CO and unburned hydrocarbons can be converted. The converters can be stocked individually and as many used per car as the condition of the car warrants. The same units are usable on any cars (including trucks). In the event that they cannot bring the level down to 1½% CO and 275 p.p.m. hydrocarbons, a series of these converters can, at low expense, remove huge quantities of the smog producing constitutents as well as perform the silencing required of an exhaust system without undue back pressure. The units are of small size (preferably about 4 inches in diameter) so that they can be readily positioned in substantial numbers under an automobile. They can be interconected by normal size exhaust conduits to form a complete automotive exhaust system which can even be made straight and bent to suit the particular car upon installation.

It is assumed, of course, that the required amount of secondary air is furnished to the exhaust gas upstream of the converters 1 or 101 to permit combustion to occur in the catalyst beds.

Modifications may be made in the structure illustrated

I claim:

1. A gas flow component for an automotive exhaust system or the like comprising a gas flow conduit providing a first path for gas flow, means forming a chamber adjacent the conduit, said conduit having first and second opening means therein connecting it to the chamber, said opening means and said chamber providing a second path for gas flow wherein the gas enters the chamber from said conduit through the first opening means and reenters the conduit after flow in the chamber through the second opening means, and venturi means in the conduit having a reduced pressure portion located adjacent said second opening means to induce gas to flow in said second path.

2. A gas flow component as defined in claim 1 including baffle means in said chamber located between the connection of said first and second opening means with said chamber to provide for gas flow through the chamber.

3. A gas flow component as defined in claim 2 including catalyst material in said chamber in said second path of gas flow.

4. A gas flow component as defined in claim 1 including catalyst material in said chamber in said second path of gas flow.

5. A gas flow component as defined in claim 1 wherein said venturi means comprises an indentation in the conduit adjacent the second opening means.

6. A gas flow component as defined in claim 5 wherein said indentation includes a downstream wall extending into the conduit and at least a portion of said second opening means is formed in said wall.

References Cited by the Examiner

UNITED STATES PATENTS

| | | | |
|---|---|---|---|
| 1,811,762 | 6/1931 | Schnell. | |
| 1,919,626 | 7/1933 | Finn | 23—288 |
| 2,288,943 | 7/1942 | Eastman | 23—288 |
| 2,371,148 | 3/1945 | Burk | 23—288 X |
| 2,664,340 | 12/1953 | Houdry | 23—288 X |
| 2,764,969 | 10/1956 | Weiss. | |
| 2,956,865 | 10/1960 | Williams. | |
| 3,036,897 | 5/1962 | Uphoff | 23—288 |
| 3,065,595 | 11/1962 | Gary. | |
| 3,090,677 | 5/1963 | Scheitlin et al. | 23—288 |
| 3,100,140 | 8/1963 | Ashley et al. | 23—288 |

FOREIGN PATENTS 631,368   6/1936   Germany.

MORRIS O. WOLK, *Primary Examiner.*

J. SCOVRONEK, *Assistant Examiner.*